United States Patent [19]
Vane

[11] 3,840,300
[45] Oct. 8, 1974

[54] MICROFICHE CAMERA

[76] Inventor: Rodney D. Vane, 9 Harvest Rd., Fairport, N.Y. 14450

[22] Filed: Apr. 9, 1973

[21] Appl. No.: 349,236

[52] U.S. Cl. ............... 355/53, 354/124, 355/65, 355/66, 355/86
[51] Int. Cl. ........................... G03b 27/42
[58] Field of Search ............ 355/53, 86, 64, 65, 66, 355/40, 42, 43; 354/124

[56] References Cited
UNITED STATES PATENTS

| | | | |
|---|---|---|---|
| 2,148,620 | 2/1939 | Henderson | 355/65 |
| 2,487,561 | 11/1949 | Landrock et al. | 355/26 |
| 2,573,278 | 10/1951 | Rowe et al. | 354/124 |
| 3,680,461 | 8/1972 | Amesbury et al. | 355/53 X |
| 3,685,902 | 8/1972 | Blackert | 355/53 X |
| 3,697,176 | 10/1972 | Kuehnle | 355/27 |

*Primary Examiner*—Richard L. Moses
*Attorney, Agent, or Firm*—Schovee & Boston

[57] ABSTRACT

A table-top microfiche camera with a document platen on the top surface, a lens, shutter, film holder, an x-y slide system for moving the film holder to make exposures in a predetermined sequence on a piece of film, and an inner light-tight wall including a flexible bellows for sealing against the film pack during its x-y movements. The lens is mounted for movement in a lens mount and includes a format mask that moves temporarily into light-sealing contact with the film immediately prior to each exposure for holding the film flat to provide image accuracy and to minimize distortion, and for locating the film in perfect focus. The film pack includes a notch that registers with the lens for insertion into and removal from the film holder only when the film holder is in position such that the first row of frames of the film in the film pack is in line with the lens.

3 Claims, 10 Drawing Figures

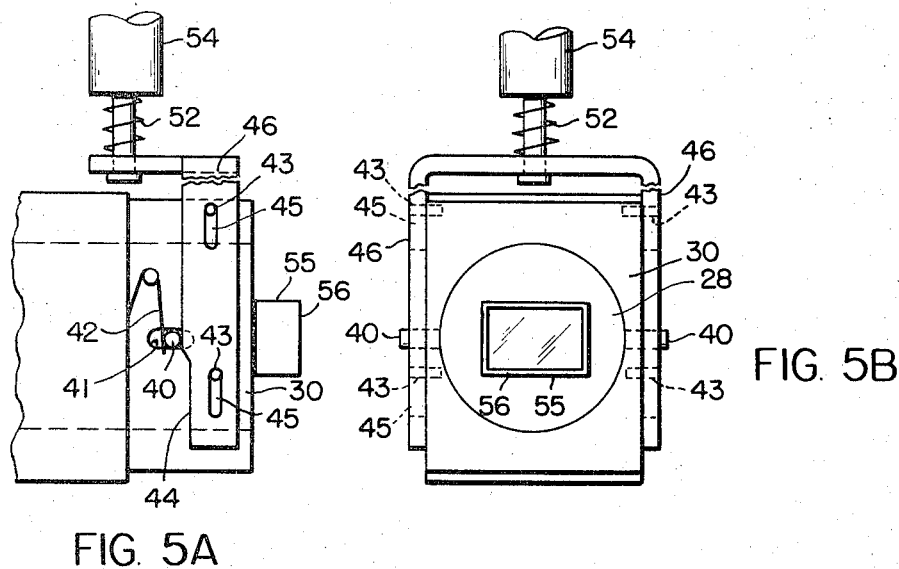
FIG. 5A
FIG. 5B
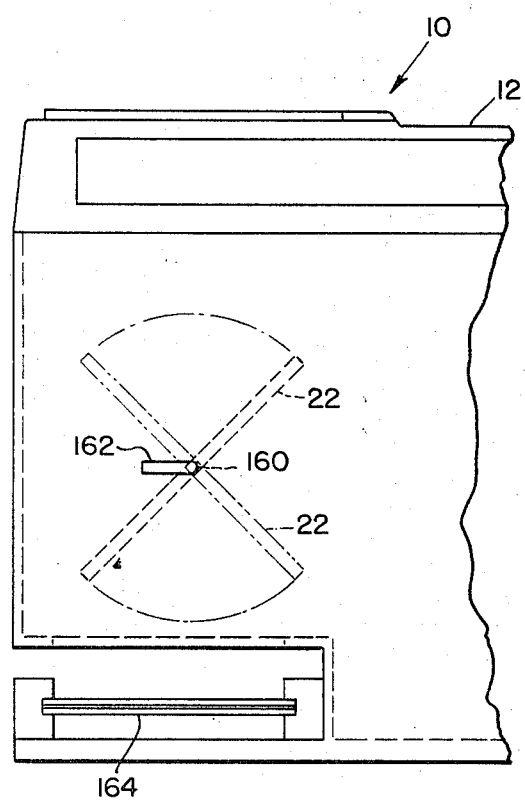
FIG. 7

MICROFICHE CAMERA

BACKGROUND OF THE INVENTION

This invention relates to the production of microfiche and in particular to an improved table-top microfilm camera.

Microfilm cameras are well-known in the art, however, they are large and relatively expensive pieces of equipment including, for example, expensive and complex means for holding the document flat against the platen, and means for focusing the image on the film and means for holding the film flat.

It is a primary object of the present invention to provide an improved, inexpensive, table-top microfilm camera that does not require the above-referred to expensive and complex pieces of equipment.

SUMMARY OF THE INVENTION

A document to be microfilmed is placed on the platen on top of the camera housing and a print button pushed. The lens moves into light-tight contact with the film (holding the film flat and the image in perfect focus), the shutter solenoid is then energized to open the shutter, and the electronic flash unit is then energized making the exposure. The lens then moves out of contact with the film and the x-y slide system moves the film holder and the film pack received therein a predetermined distance properly positioning the film for the next exposure. A flexible bellows provides a light-lock against the moving film pack. A notch in the film pack ensures that if the film pack fits into the film holder, the film holder has located the film such that the lens is in line with the first row of frames on the film.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIGS. 5A and 5B are enlarged side and front views of the lens and lifting cam;

FIG. 7 is a cross-sectional view of another embodiment of the present invention.

DETAILED DESCRIPTION OF THE PREFERRED EMBODIMENTS

Figure 1:
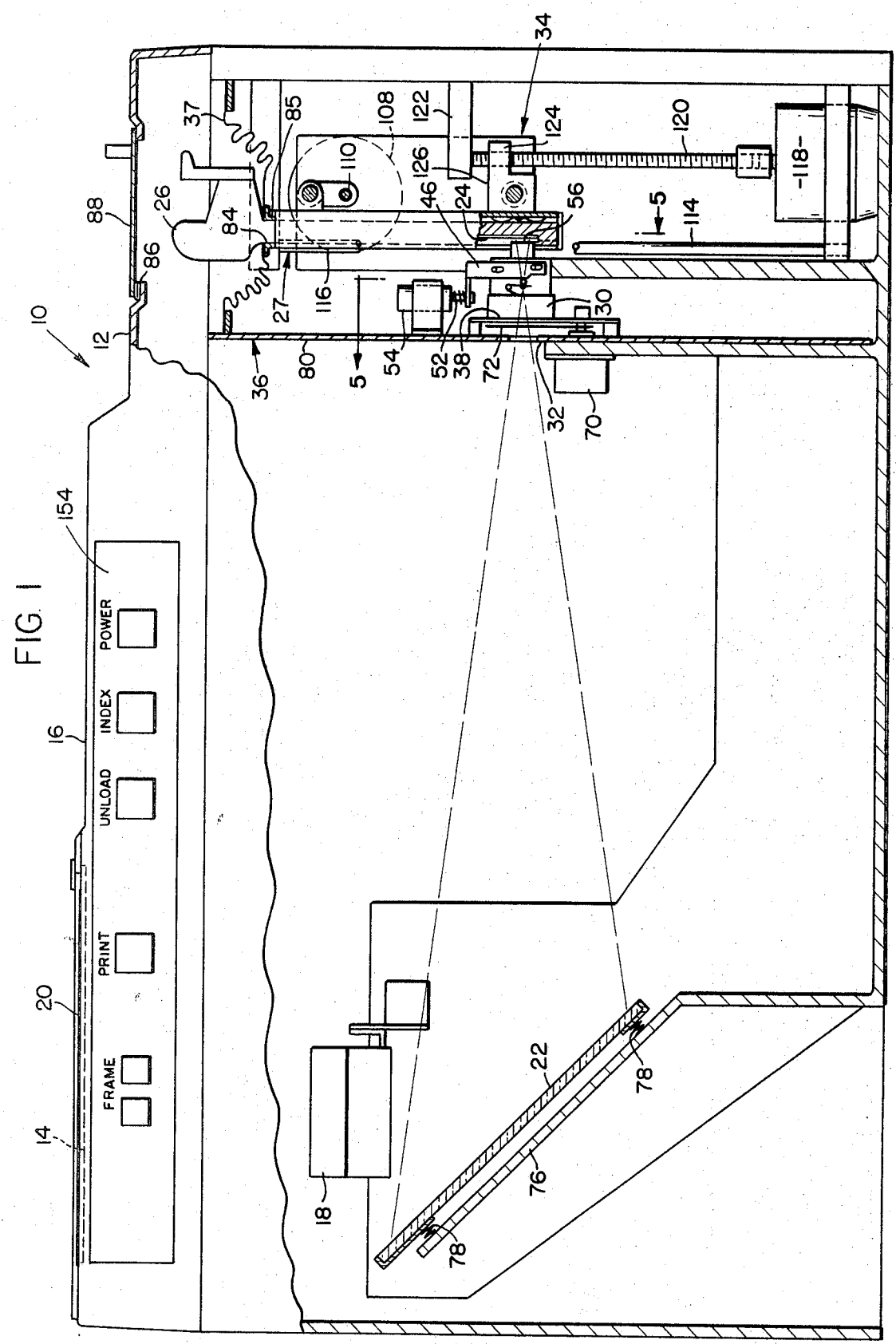
FIG. 1 is a partially cut-away, partially cross-sectional side view of the camera of the present invention.

With reference now to the drawings, a brief description of the overall combination of elements of the camera will first be made followed by a detailed description of each element. FIG. 1 shows a microfiche camera 10 made according to the present invention. The camera 10 includes a housing 12 having a transparent document platen 14 on a top surface 16 of the housing 12. A pair of electronic flash units 18 are located beneath the platen 14 for illuminating a document 20 on the platen 14. Light from the document 20 is reflected from a mirror 22 toward a sheet of film 24 in a film pack 26 inserted into a film holder 27. The document image is focused on the film 24 by a lens 28 (by the term "lens" is meant a lens system including a desired number of individual glass or plastic lenses mounted in a tubular sleeve) slidably mounted inside of a lens mount 30. Light passage through the lens 28 is controlled by a shutter 32. The location on the film 24 on which the exposure is to be made is controlled by an x-y slide system 34. The film 24 is located in the housing 12 within a light-tight inner wall 35 including a bellows 37. An upper portion of the film pack 26 is outside of the wall 36, extending through the flexible, light-tight bellows 37 whereby a light shield over the film 24 can be removed after inserting the film pack 26 into the film holder 27, and whereby the exposed film can be shielded from light again before removal from the film holder. This feature is well-known in the art and a standard Polaroid brand Film Holder can be used as the film pack 26 in the present invention.

The means for moving the lens 28 into contact with the film 24 will now be described in detail, with reference to FIGS. 1 and 5A and 5B. The lens 28 is slidably mounted in the lens mount 30, which is connected to a wall 80. A pair of cam (pin) followers 40 are connected to the lens 28 on opposite sides thereof, and extend through grooves 41 in the lens mount 30, and are held by a spring 42 against a sliding cam surface 44 on a lifting cam 46. The lifting cam 46 is mounted for vertical movement by a pair of pins 43 connected to the lens mount 30 and projecting through grooves 45 in the lifting cam 46. The cam 46 is held in a first (normal or rest) position (shown in FIG. 1) by a compression spring 52, and is moved to a second position when a pull solenoid 54 is energized. When the cam 46 moves to its second position, the spring 42 causes the cam followers 40 to ride down the cam surface 44 moving the lens 28 toward the film 24 until a format mask 55 portion of the lens 28, including a precision ground surface 56, contacts the film 24 in a light-tight manner. The interior area surrounded by the surface 56 defines the image area or frame on the film 24. The format mask surface 56 holds the film 24 flat to the film pack back to maintain accuracy of image and to minimize distortion, and also to ensure that the document image is in exact focus on the film 24.

When the camera is not in use and when the step-repeat mechanism of the s-y slide system is moving the film pack 26 to a new location, and when the camera is waiting for a new instruction, the compression spring 52 forces the lifting cam 46 downward causing cam followers 40 to ride up cam surface 44 until the precision ground surface 56 moves back clear of the film 24. When the "print" button is depressed, the pull solenoid 54 is energized, which lifts the cam surface 44 to its second position, causing the lens 28 to move toward the film 24. The motion toward the film 24 ceases when the force of such motion is overcome by the resistance of the film 24 and film pack 26.

The shutter 32 includes a rotary solenoid 70 which when energized moves a sector-shaped shutter blade 72 out of the light path from the mirror 22 to the lens system. This camera 10 can employ any of a number of known lens systems and thus this element of the camera 10 need not be described in detail. After the shutter is opened, the electronic flash units 18 are energized to control the exposure.

The mirror 22 is preferably a 1/4 inch thick mirror clipped to a support plate 74 mounted in turn on a support 76 by springs 78 on a 3-point spring suspension system.

The light-tight inner wall 36 includes a vertical wall 80 in which the lens mount 30 is mounted. The inner wall 36 also includes the substantially horizontal, flexible, cloth bellows 37 including an aperture 84 that engages an upper end of the film pack 26 in light-tight manner. Preferably the aperture 84 is slightly smaller than the cross-section of the film pack 26 so that as the film pack is inserted, it forces a flap 85 of the bellows material down alongside of it, providing the light-lock. The bellows 37 maintains the light-lock as the x-y slide system moves the film pack 26 both vertically and horizontally. The film pack 26 is inserted in the film holder 27 first through an opening 86 in the surface 16, closed by a door 88, and then through the aperture 84. The portion of the bellows adjacent the aperture 84 is preferably connected to the top of the film holder 27.

The film holder 27 forms part of the x-y slide system and receives the film pack 26 therein. The film holder 27 is shown in each of FIGS. 1, 2, 3A, 3B, and 4. As best shown in FIGS. 3A and 3B, the film holder includes a metal sheet formed as shown, with a front opening 90, a bottom flange 92, and a notch 94 for mating with a raised rib 96 on the film pack 26 when the film pack is completely received within the film holder 27. Four flat springs 98 are attached to a back wall 100 of the film holder 27 for pressing against the back of the film pack 26 to force it as far forward as possible to properly locate it in the film holder 27.

Figure 2:
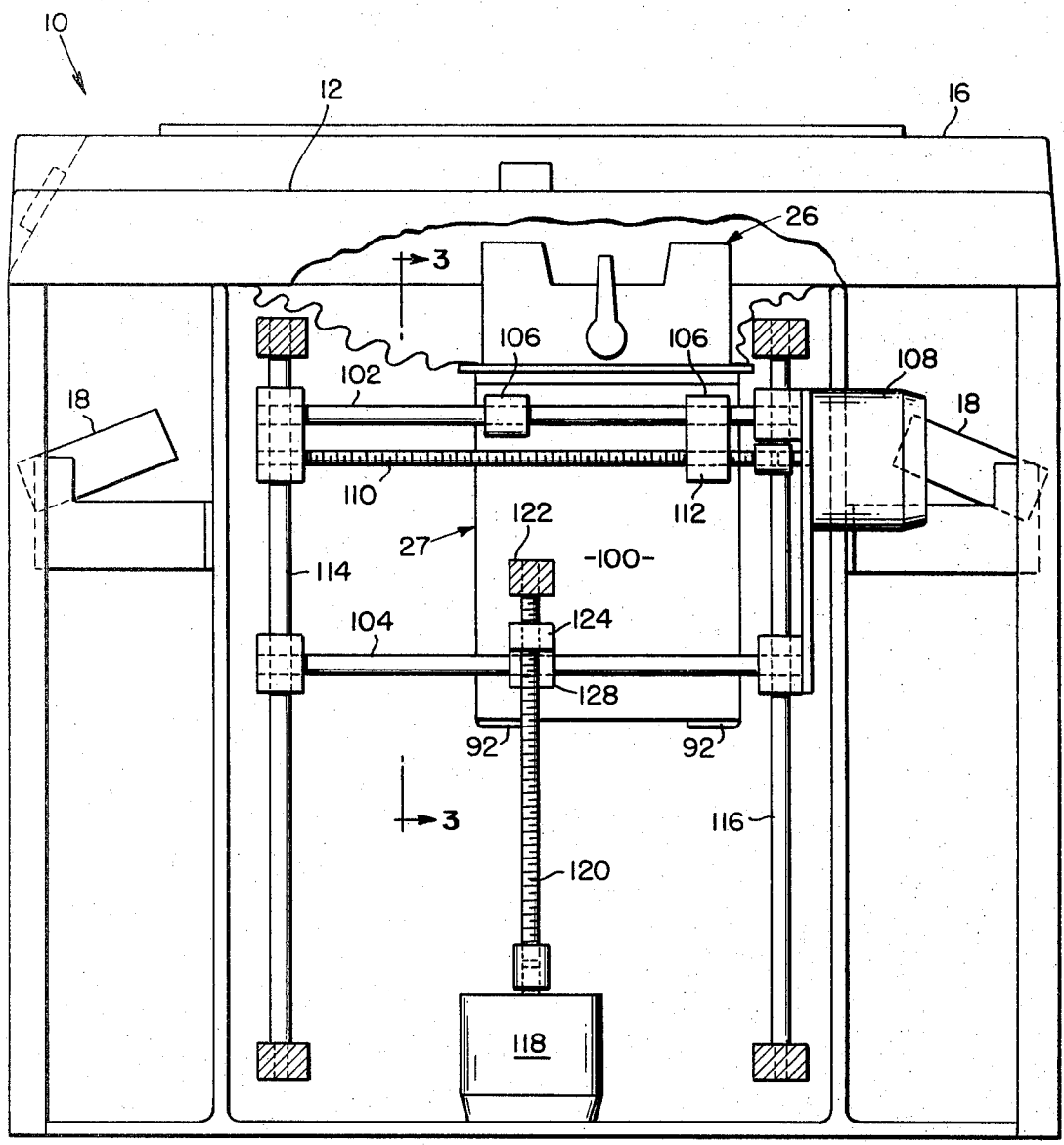
FIG. 2 is an elevational view of the x-y slide system used in the camera of FIG. 1.
Figure 3B:
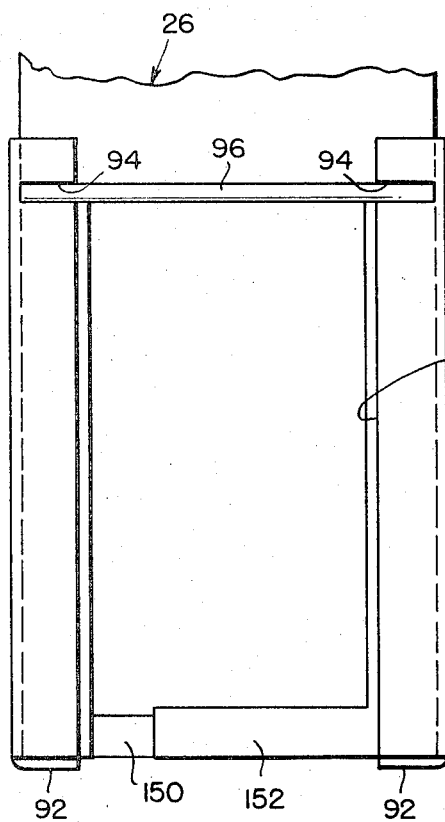
FIG. 3B is a front view of the film holder.
Figure 3A:
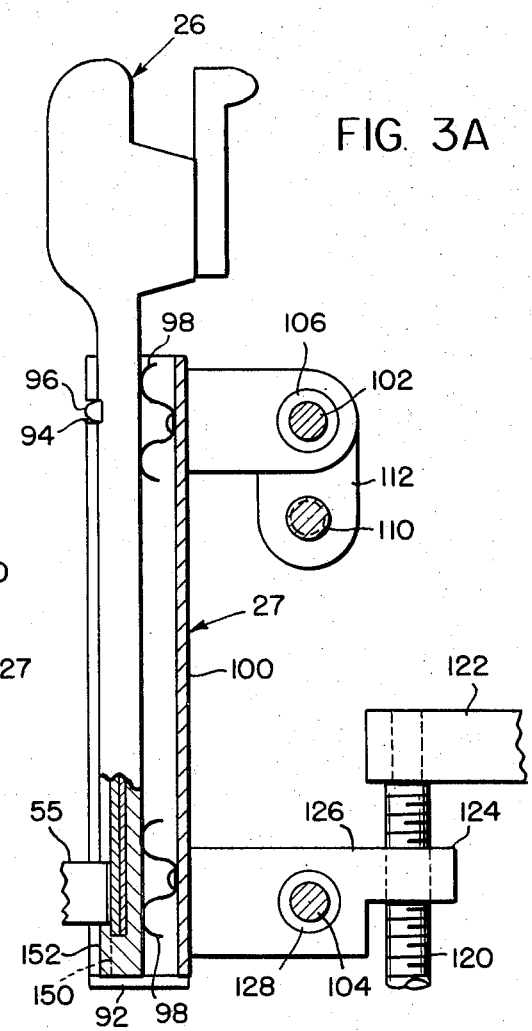
FIG. 3A is a partial corss-sectional view along line 3—3 of FIG. 2.
Figure 4:
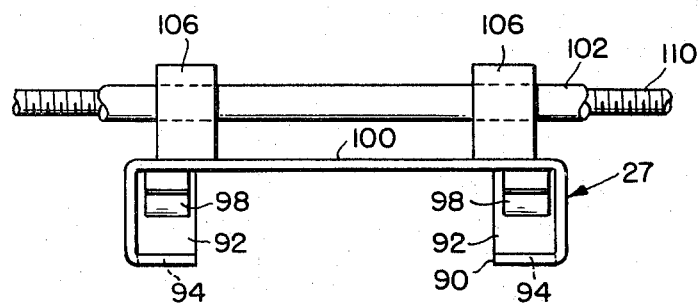
FIG. 4 is a plan view of the film holder of FIG. 3B.

As best shown in FIG. 2, the film holder 27 is slidably mounted on a pair of horizontal rods 102 and 104, by bearings 106. Also mounted on the horizontal rods 102 and 104 is a stepper motor 108 connected to a lead screw 110 in threaded engagement with a nut 112 connected to one of the bearing blocks. The motor 108 thus controls the x-position of the film holder 27.

The two rods 102 and 104 are slidably mounted on two vertical rods 114 and 116 by a pair of linear bearings on each rod 102 and 104. A stepper motor 118 is mounted to a stationary base of the housing 12 and is connected to a lead screw 120, the other end of which is connected to a rigid arm 122. The lead screw 120 is threadingly connected to a nut 124 in a bar 126 having a bearing 128 riding on rod 104. The motor 118 thus controls the vertical movement of the film holder 27. The operation of this type of x-y slide system is well known to those skilled in the art and need not be described in further detail.

With reference now particularly to FIGS. 3A and 3B, the film pack 26 includes the rib 96 that fits into the notch 94 in the film holder 27. A bottom flange 152 of the film pack 26 has a notch 150 therein the purpose of which is to allow the film pack 26 to be withdrawn from and inserted into the film holder over the format mask 55 of the lens 28. The lens 28 even in its retracted position, is still close to the film, as shown in FIG. 3B. The notch 150 is in line with the first row of frames of film in the film pack 26. Since, after the printing of one sheet of film is completed, the x-y slide system and the electric circuit automatically moves the film holder to the position for printing frame number 1 (in the lower left hand corner of the film as the film is viewed from the left in FIG. 1 in the film pack--but in the upper left hand corner as the microfiche will be viewed), the notch 150 provides the operator with a check on any possible malfunctioning in the camera. That is, if the film pack 26 will not come out or will not go in, then the lens mount is not aligned with the first row of frames as it should be.

Figure 6A:
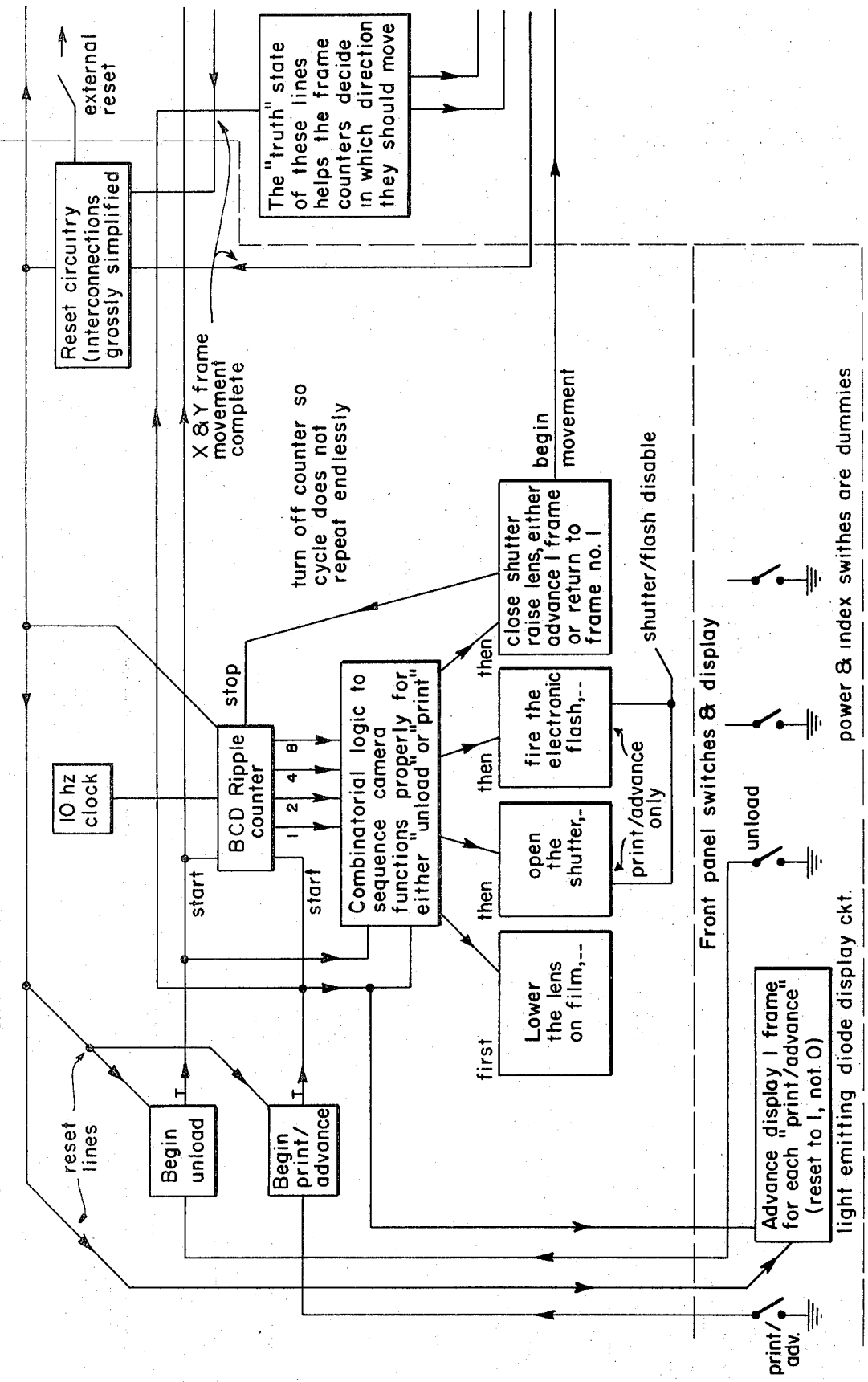
FIGS. 6A and 6B are a diagrammatic block diagram of the electrical system of the camera of FIG. 1.
Figure 6B:
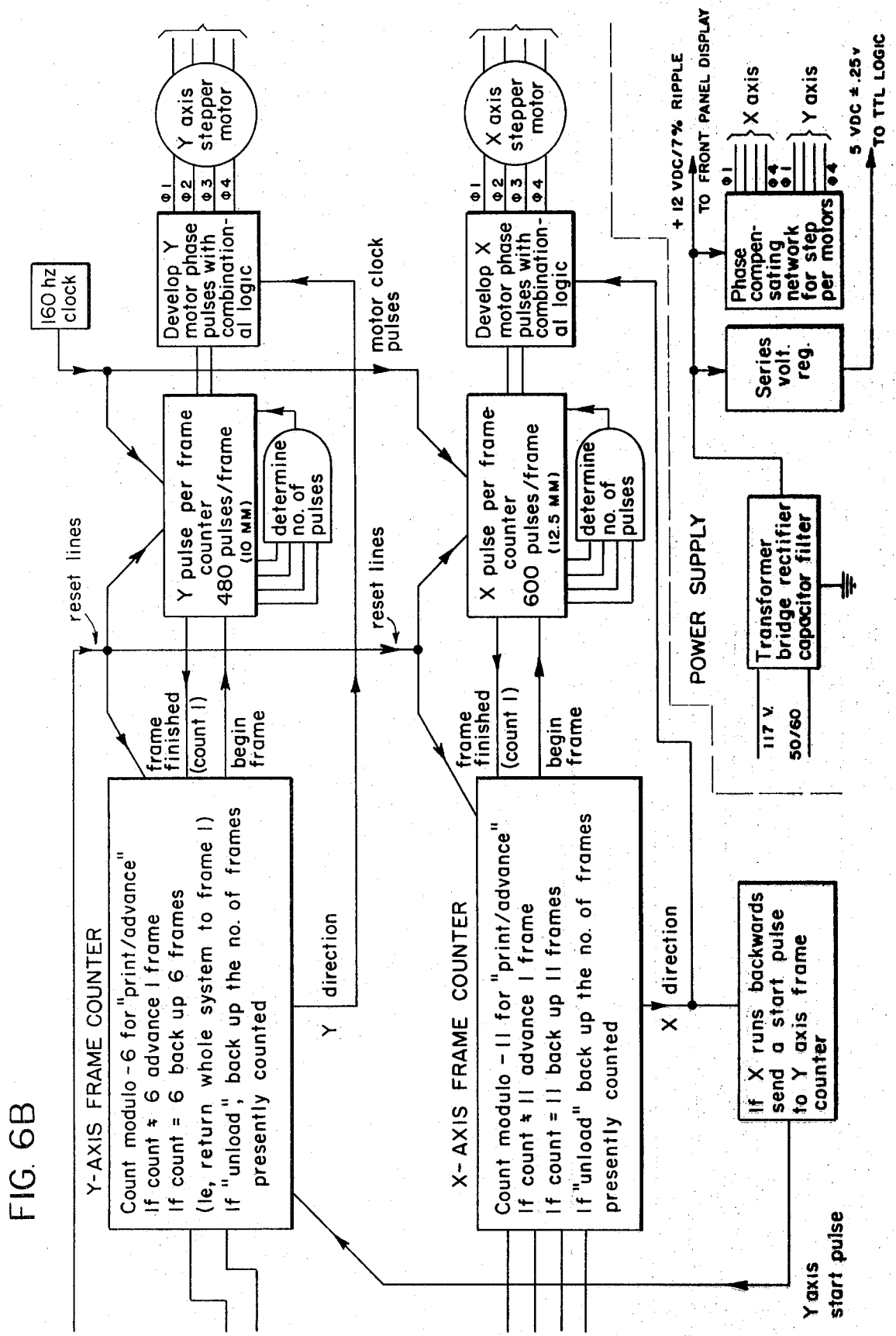

FIGS. 6A and 6B diagrammatically illustrate the electrical circuit in the camera of the present invention. Since the circuit itself forms no part of the present claimed invention, a detailed description thereof is not necessary, however, the information in FIGS. 6A and 6B is provided to complete the overall picture and will be readily understood by one skilled in the art.

For example, referring to FIGS. 6A and 6B, when the PRINT/ADVANCE button is depressed on a front panel 154, the BCD ripple counter causes the following sequence of functions to occur, (1) move the lens 28 onto the film 24, then (2) open the shutter 32, then (3) fire the electronic flash units 18, then (4) close the shutter, remove the lens 28 from the film, and either advance one frame or return to frame one. The latter step is carried out by the x-axis and the y-axis frame counters and x-axis and y-axis stepper motors.

Further, it is noted that the circuit provides sufficient time delays to allow the vibrations caused by the motion of the lens to damp out before an exposure is made, and further to assure that the lens is in the proper position before the next function is initiated. The electronic circuit also provides an automatic filing feature as follows. A standard form for a microfiche includes an index for future reference. Rather than keep the bulky table of contents around, convention has it that the last few frames of the microfiche be reserved for making file copies of this index (usually no more than 3 or 4 sheets of index). Normally, records are put on a microfiche from upper left, line by line, to lower right. However, the first file copy of the index sheet goes in the lower right frame and the second sheet in the next to the last frame, etc. In this way, the first sheet of the index can be found quickly and easily by just going to the lower right frame.

To make an exposure, the operator needs only depress the PRINT button and the electronic circuit carries out both operations in sequence. When it is time to record the table of contents, the operator depresses the index button, and the circuit carries out the three functions of: (1) the x-y slide system drives the film 24 to position the last frame in the exposure position behind the lens system, (2) the electronic logic switches itself so that the camera "advances" in reverse after each exposure, and (3) the light emitting diode frame counter lights with F1, telling the operator to record the first index sheet, as soon as steps (1) and (2) are complete.

To record the first index sheet, the operator then depresses the PRINT button. The camera 10 prints, backs up to the next to the last frame, and the counter lights up F2. When the operator finishes recording the index, he depresses the "UNLOAD" button. This moves the film pack 26 back to the exposure position for frame 1, locks out the PRINT button to prevent double exposures, and then turns on a light over the "UNLOAD" button. This tells the operator that the film pack 26 can be removed for processing. During normal exposure, the film pack 26 locks into the camera 10, to prevent premature removal.

A second embodiment of the mirror 22 will now be described with reference to FIG. 7. In this embodiment the mirror 22 is mounted for pivotal movement about a horizontal shaft 160 by a lever 162 outside the housing 12. By flipping this lever 162, the mirror is turned 90 degrees whereby a document can be placed below and in contact with a second document platen 164 located below the platen 14. The second platen 164 is used, if desired, by placing a document below platen 164 face-up against the platen by any known means. The remaining steps of the operation are the same as when using platen 14.

The present invention has been described in detail with reference to the preferred embodiments thereof, however, the present invention is not to be limited to the details thereof but includes various modifications thereof as will be understood by one skilled in the art. For example, the invention is useful with any type of light-sensitive material and not just silver halide. The term "film" is hereby defined for use in the present specification and claims as including all light-sensitive materials. The "film" may be removed from the camera 10 for development or it can be developed inside the camera 10. Other optical arrangements can be used having more mirrors or having no mirrors at all. Other means than the disclosed x-y slide system can be used for properly locating each image in the correct position on the film. The term "format mask" is hereby defined to mean a wall that defines the size of the exposed microfilm frame, and an end surface that provides a light-lock.

The invention has been described in detail with particular reference to the preferred embodiment thereof, but it will be understood that variations and modifications can be effected within the spirit and scope of the invention as described hereinabove and as defined in the appended claims.

I claim:

1. A microfilm camera comprising:
   a. a housing;
   b. a flat, horizontal, transparent document platen on a top wall of said housing on which a document to be microfilmed is positioned face-down;
   c. a light source located in said housing below said document platen;
   d. a film holder;
   e. an x-y slide system for moving said film holder in an x-y direction;
   f. a lens mounted in a lens mount, said lens mount being positioned between said document platen and said film holder;
   g. a shutter adjacent said lens system; and
   h. an inner light-tight wall enclosing said film holder and including a flexible bellows having a film pack receiving aperture therein, said aperture including light-tight sealing means, whereby a film pack can be inserted partway through said bellows in light-tight relationship thereto.

2. A microfilm canera comprising a table top housing and a transparent document platen in a top wall of said housing for receiving a document to be microfilmed, means inside of said housing for exposing said document and producing a microfilm image on a sheet of film, a film holder in said housing, an x-y slide system in said housing connected to said film holder for moving said film holder in an x-y direction, a film pack opening in an upper surface of said housing above said x-y slide system through which a film pack can be inserted into and removed from said film holder, and an inner light-tight wall enclosing said film holder and including a flexible bellows having a film pack receiving aperture therein, said aperture including light-tight sealing means whereby a film pack can be inserted part way through said bellows in light-tight relationship thereto.

3. A microfilm camera comprising a table top housing and a transparent document platen in a top wall of said housing for receiving a document to be microfilmed, means inside of said housing for exposing said document and producing a microfilm image on a sheet of film, and wherein said exposing means includes a mirror, and including a second document platen adjacent a bottom wall of said housing against which documents are placed face-up, and including means for moving said mirror for exposing a document on either platen.

* * * * *